US012580907B2

(12) United States Patent
Kanamaru

(10) Patent No.: US 12,580,907 B2
(45) Date of Patent: Mar. 17, 2026

(54) COMMUNICATION SEQUENCE CONTROL BETWEEN VEHICLE AND POWER FACILITY

(71) Applicant: TOYOTA JIDOSHA KABUSHIKI KAISHA, Toyota (JP)

(72) Inventor: Keisuke Kanamaru, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 18/665,802

(22) Filed: May 16, 2024

(65) Prior Publication Data

US 2024/0430250 A1      Dec. 26, 2024

(30) Foreign Application Priority Data

Jun. 20, 2023      (JP) ................................. 2023-100505

(51) Int. Cl.
H04L 9/40      (2022.01)
B60L 53/14      (2019.01)
B60L 53/66      (2019.01)

(52) U.S. Cl.
CPC .......... H04L 63/0823 (2013.01); B60L 53/66 (2019.02); B60L 53/14 (2019.02)

(58) Field of Classification Search
CPC ....... H04L 63/0823; B60L 53/14; B60L 53/66
USPC .......................................................... 726/6
See application file for complete search history.

(56) References Cited

U.S. PATENT DOCUMENTS

| | | | | |
|---|---|---|---|---|
| 7,774,779 | B2 * | 8/2010 | Seelig ...................... | G06F 9/52 |
| | | | | 718/100 |
| 7,953,870 | B1 * | 5/2011 | Reeves ................... | H04L 67/02 |
| | | | | 709/227 |
| 2015/0163306 | A1 * | 6/2015 | Nakagawa .............. | B60R 25/24 |
| | | | | 709/225 |
| 2020/0089909 | A1 * | 3/2020 | Kim ........................ | G06F 21/44 |
| 2023/0402854 | A1 * | 12/2023 | Nagaoka ............. | H04L 63/0823 |
| 2025/0227099 | A1 * | 7/2025 | Jost ........................ | H04L 63/08 |

FOREIGN PATENT DOCUMENTS

| | | | | |
|---|---|---|---|---|
| JP | 2022061185 A | * | 4/2022 | |
| JP | 2024128711 A | * | 9/2024 | .............. B60L 53/60 |

* cited by examiner

*Primary Examiner* — David P Zarka
(74) *Attorney, Agent, or Firm* — Oliff PLC

(57) ABSTRACT

The vehicle is configured to be capable of performing external charging for charging the battery by a power facility provided outside the vehicle. The vehicle includes a storage device and a control device. The storage device stores certificate data for permitting execution of external charging. The control device controls a communication sequence executed between the power facility and the vehicle before the start of the external charging. The certificate data has an expiration date. The control device executes an update process for updating the certificate data when the expiration date has expired at the start of the communication sequence, and suspends the communication sequence when the timeout of the update process is predicted.

4 Claims, 5 Drawing Sheets

NO IN S250
(TIMEOUT)

S252

REQUEST TO END
COMMUNICATION
SEQUENCE

EN-RQ

300

TO S155

COMMUNICATION SEQUENCE CONTROL BETWEEN VEHICLE AND POWER FACILITY

CROSS-REFERENCE TO RELATED APPLICATION

This application claims priority to Japanese Patent Application No. 2023-100505 filed on Jun. 20, 2023, incorporated herein by reference in its entirety.

BACKGROUND

1. Technical Field

The present disclosure relates to a vehicle.

2. Description of Related Art

Japanese Unexamined Patent Application Publication No. 2022-61185 (JP 2022-61185 A) discloses a charging authentication device. This device includes an in-vehicle processing unit and a vehicle-side authentication unit. The in-vehicle processing unit is mounted on a vehicle, and communicates with a charging device outside the vehicle. The charging device is used to charge a rechargeable battery of the vehicle (to execute external charging). The vehicle-side authentication unit transmits authentication information issued in advance for a user of the vehicle to a server device. This information includes a digital certificate (certificate data) that has an expiration period.

SUMMARY

Before the start of the external charging, in general, a communication sequence is executed to exchange various information between the vehicle and a power facility outside the vehicle. To start the external charging by executing the communication sequence, it is necessary that the certificate data should not have expired. When it is found that the certificate data have expired at the start of the communication sequence, it is necessary to update the certificate data (update process for certificate data) by accessing a server or the like that manages the certificate data. However, the update process occasionally times out when the update process takes time due to a reduction in the communication speed or the like. As a result, the communication sequence is not completed but ended halfway, and the external charging cannot be started. After that, when an operation to start the external charging is performed again, there is a possibility that the information that has already been exchanged since the start until the end of the previous communication sequence is exchanged again in the current communication sequence. This is not preferable from the viewpoint of the efficiency of information transfer in the communication sequence.

The present disclosure has been made in order to address the above-described issue, and an object thereof is to provide a vehicle capable of improving the efficiency of information transfer in a communication sequence when certificate data have expired at the start of the communication sequence before external charging.

An aspect of the present disclosure provides a vehicle capable of executing external charging for charging an in-vehicle power storage device using a power facility provided outside the vehicle. The vehicle includes a storage device and a control device. The storage device stores certificate data for permitting execution of the external charging. The control device controls a communication sequence executed between the power facility and the vehicle before start of the external charging. The certificate data have an expiration period. The control device is configured to execute an update process for updating the certificate data when the expiration period has expired at start of the communication sequence, and suspend the communication sequence when a timeout of the update process is predicted.

With the above configuration, the communication sequence is suspended before the update process times out. This allows the update process to be completed while the communication sequence is suspended, thereby updating the expiration period of the certificate data. As a result, expiration of the expiration period is eliminated. Thus, a situation in which the communication sequence is ended halfway due to expiration of the expiration period is avoided. Hence, it is possible to improve the efficiency of information transfer in the communication sequence.

According to the present disclosure, it is possible to improve the efficiency of information transfer in a communication sequence when certificate data have expired at the start of the communication sequence before external charging.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
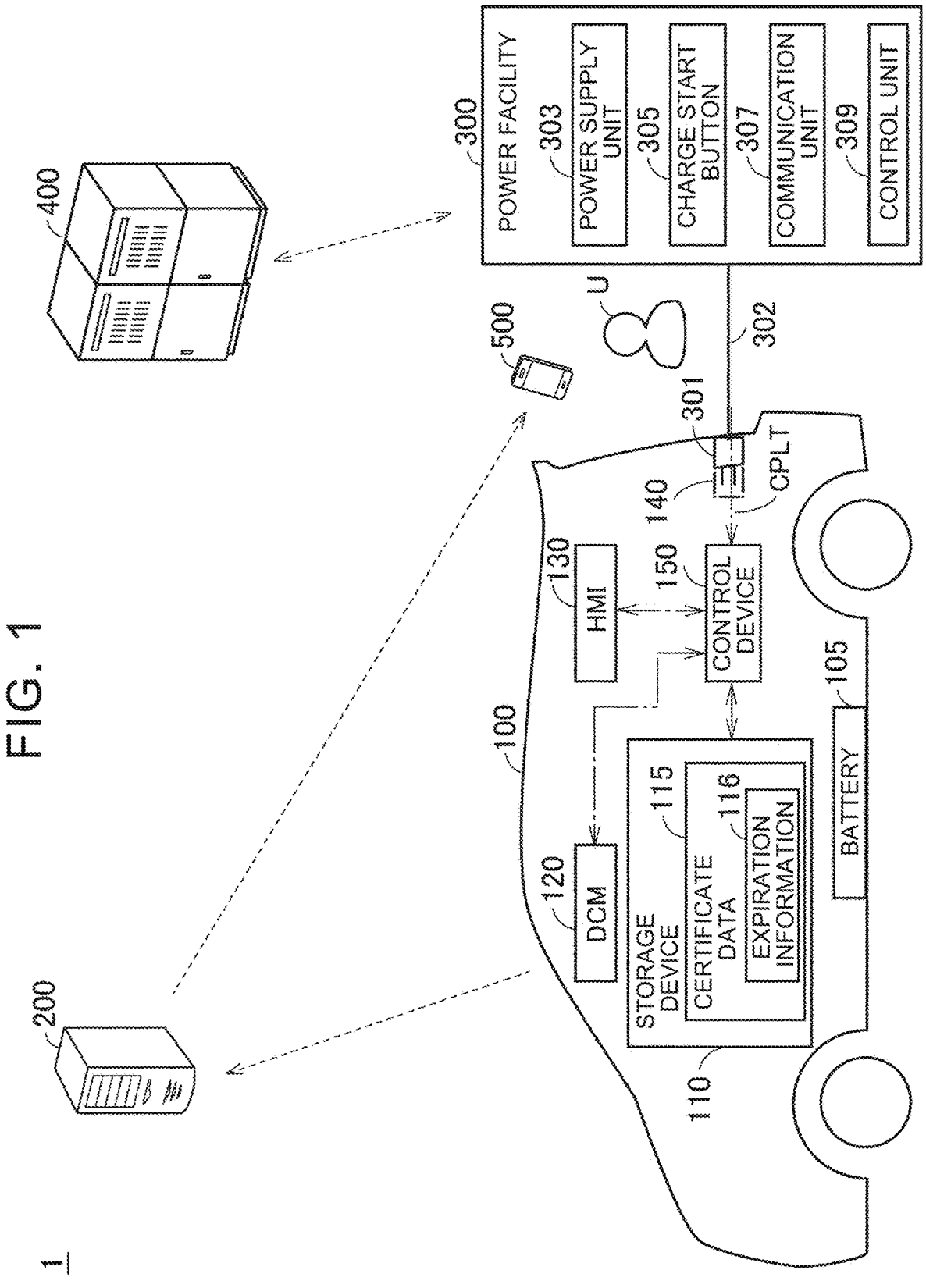
FIG. 1 is a diagram schematically illustrating an overall configuration of a charging processing system according to the present embodiment.

Hereinafter, embodiments of the present disclosure will be described in detail with reference to the drawings. The same or corresponding parts in the drawings are denoted by the same reference numerals, and the description thereof will not be repeated. Each of the embodiments and the modification examples thereof may be combined with each other as appropriate.

FIG. 1 is a diagram schematically illustrating an overall configuration of a charging processing system 1 according to the present embodiment. Referring to FIG. 1, the charging processing system 1 includes a vehicle 100, a server 200, a power facility 300, a certificate server 400, and a mobile terminal 500.

The vehicle 100 is a battery electric vehicle (BEV: Battery Electric Vehicle). Vehicle 100 includes a battery 105, a storage device 110, a data communication module (DCM) 120, a human machine interface (HMI) device 130, an inlet 140, and a control device 150.

The battery 105 is a secondary battery such as a lithium-ion battery, and is an example of a power storage device mounted on the vehicle 100. The battery 105 stores electric power for traveling by the vehicle 100. The vehicle 100 is configured to be capable of performing external charging for charging the battery 105 by the power facility 300. In this example, the power supply from the power facility 300 to the vehicle 100 is DC power. External charging using DC power is also referred to as "DC charging".

In the present embodiment, the external charging is DC charging, specifically charging called plug-and-charge (P&C). The P&C is automatically executed after the power facility 300 confirms that the vehicle 100 is an authenticated vehicle (described later) that has received a predetermined authentication. "Automatically executed" means executed without a user operation (for example, an operation on the charge start button 305 of the power facility 300) for starting DC charging. That is, according to the P&C, the communication sequence is automatically started in response to the connection (insertion) of the connector 301 of the power facility 300 to the inlet 140, and DC charge is automatically executed after the completion of the communication sequence. Therefore, the user U basically only needs to insert the connector 301 into the inlet 140 at the time of P&C, and does not need to present an electronic device such as an IC card for authorization. As a result, it is possible to improve the convenience of the user U.

The P&C is executed based on a contract between the operator and the user U as a service provided by a predetermined mobility operator. Hereinafter, an example in which the external charging is P&C will be mainly described.

The storage device 110 is a secure memory and stores certificate data 115. The certificate data 115 is used to authorize the execution of the P&C. Certificate data 115 verifies by electronic signature that vehicle 100 is an authenticated vehicle that has received a predetermined authentication. This certification is given by the operator to the vehicle 100 if the user U is a mobility operator for a contract to use P&C charging services. In this example, user U has made the above contract with this operator. The certificate data 115 includes expiration date information 116. The expiration date information 116 indicates the expiration date of the certificate data 115. In this way, the certificate data 115 has an expiration date. When the expiration date expires, the above authentication expires and the P&C cannot be executed. The certificate data 115 is used in a communication sequence executed between the vehicle 100 and the power facility 300 before the start of the P&C.

The communication sequence is a process of exchanging various kinds of information between the vehicle 100 and the power facility 300 before the start of the P&C. The information includes various kinds of information (vehicle information) related to the vehicle 100 and specification information (facility information) of the power facility 300. The vehicle information includes authentication information (for example, credit card information) of the user U regarding the charging service and identification information (for example, manufacturer information and identification number) of the vehicle 100. The facility information includes identification information (e.g., manufacturer information and identification number) of the power facility 300.

The communication sequence is executed in order for the power facility 300 to confirm that the vehicle 100 is an authentication vehicle, and in order for the vehicle 100 to confirm that the power facility 300 is an authentication facility. The authentication facility refers to a power facility that has received a predetermined authentication from the mobility provider. In order to execute the communication sequence and start P&C, it is necessary that the certificate data 115 has not expired. This communication sequence conforms to a predetermined international communication standard. This communication standard is, for example, an ISO 15118-20.

DCM 120 is configured to wirelessly communicate with an external device of the vehicle 100. The external device includes a server 200. HMI device 130 displays various screens. This screen includes a notification screen for notifying the user U of the expiration date of the certificate data 115.

The inlet 140 is configured to be connectable to a connector 301 of the power facility 300. In an embodiment, a communication sequence is initiated in response to the connection of the connector 301 to the inlet 140. The inlet 140 is configured to receive power supplied from the power facility 300.

The control device 150 controls various devices of the vehicle 100, such as DCM 120 and HMI device 130. The control device 150 detects the connection (insertion) of the connector 301 to the inlet 140 based on the level of the signal CPLT inputted from the power facility 300 through the inlet 140. Before the start of the P&C, the control device 150 confirms in the communication sequence that the power facility 300 is an authentication facility. The configuration and function of the control device 150 will be described in detail later.

The server 200 is configured to communicate with the vehicle 100. The server 200 is also configured to communicate with the mobile terminal 500. The mobile terminal 500 is, for example, a smartphone, and is owned by the user U of the vehicle 100. The mobile terminal 500 includes a display for displaying various screens.

The power facility 300 is provided outside the vehicle 100 and is connected to a commercial power supply (not shown). The power facility 300 includes a connector 301, a power cable 302, a power supply unit 303, a charge start button 305, a communication unit 307, and a control unit 309. The connector 301 is provided at the distal end of the power cable 302. The power supply unit 303 is configured to convert AC power from a commercial power source into DC power, and supply the converted power to the vehicle 100 through the power cable 302. The charge start button 305 may be operated by a user to start DC charge. The communication unit 307 is configured to wirelessly communicate with a certificate server 400 (described later). The communication unit 307 is also configured to execute a communication sequence with the vehicle 100. The control unit 309 controls the power supply unit 303 and the communication unit 307. Before the start of the P&C, the control unit 309 confirms in the communication sequence that the vehicle 100 is the authentication vehicle.

The certificate server 400 is operated by a mobility provider providing a charging service by P&C. The certificate server 400 may separately issue new certificate data when the certificate data 115 has expired. The certificate server 400 is configured to wirelessly communicate with the power facility 300.

Figure 2:
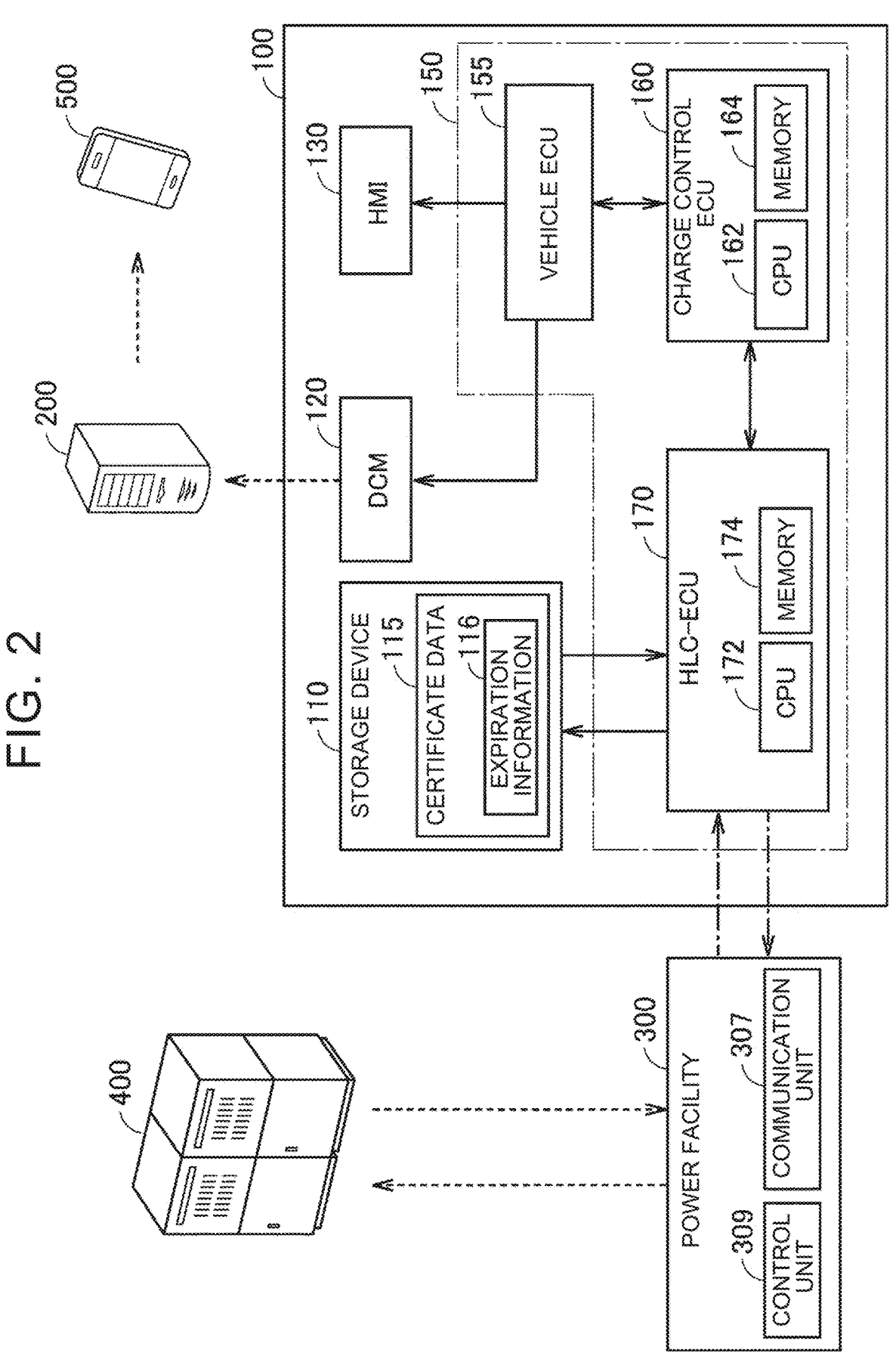
FIG. 2 is a diagram for explaining the configuration and function of a control device in detail.

FIG. 2 is a diagram for explaining the configuration and functions of the control device 150 in detail. Referring to FIG. 2, the control device 150 includes a vehicle ECU 155, a charge control ECU 160, and an HLC-ECU 170.

The vehicle ECU 155 performs overall control of the vehicle 100. The vehicle ECU 155 controls, for example, DCM 120, HMI device 130 and the charge control ECU 160.

The charge control ECU 160 includes a CPU 162 and memories 164. CPU 162 executes various arithmetic processes. The memories 164 include read only memory (ROM) and random access memory (RAM). ROM stores a program executed by CPU 162. When the connector 301 is connected to the inlet 140, the charge control ECU 160 sends a start command to HLC-ECU 170. During activation of HLC-ECU 170, HLC-ECU 170 sequentially receives information from HLC-ECU 170 indicating the status of the communication sequence and manages the communication sequence, thereby transmitting a control command for controlling HLC-ECU 170 to HLC-ECU 170. During DC charging, the charge control ECU 160 transmits information indicating the charging status of the battery 105 to the vehicle ECU 155. This includes SOC (States of Charge) of the battery 105.

HLC-ECU 170 includes a CPU 172 and memories 174. CPU 172 executes various arithmetic processes. The memories 174 include ROM and RAM. ROM stores a program executed by CPU 172. HLC-ECU 170 communicates with the power facility 300 via HLC communication, thereby controlling the pre-P&C communication sequence and controlling the power supply after the P&C starts.

HLC-ECU 170 is configured to perform an updating process of updating the certificate data 115 when the certificate data 115 has expired at the beginning of the communication sequence. This update process includes a process of updating (extending) the expiration date of the certificate data 115 to a date and time later than the current date and time. The current date and time is the date and time at which the update process is executed.

The updating process includes sending a certificate request to the power facility 300 by HLC communication. This signal is a request signal requesting the power facility 300 to cause the certificate server 400 to issue new certificate data, to acquire the issued certificate data, to transmit an acquisition completion notification indicating completion of acquisition of the certificate data to the vehicle 100, and to transmit the acquired certificate data to the vehicle 100. The update process further includes a process of receiving new certificate data from the power facility 300, a process of deleting the certificate data that has expired, and a process of storing (installing) the new certificate data as the certificate data 115 in the storage device 110.

If the execution time of the update process exceeds the reference time, the update process times out. This reference time is determined based on the above-described communication standard, and is, for example, 5 seconds.

When the expiration date of the certificate data 115 is found at the start of the communication sequence, it is necessary to access the certificate server 400 to issue new certificate data and update the certificate data 115. However, the data size of the certificate data 115 is generally large. The rate of HLC communication between the vehicle 100 and the power facility 300 may be reduced. Therefore, when both the process of updating the certificate data 115 and the above-described exchange of the vehicle information and the facility information are executed by HLC communication, the data volume of HLC communication increases. In addition, the communication speed between the power facility 300 and the certificate server 400 may be reduced. In such a case, the update process takes time. When the update process takes time and the update process times out, the certificate data 115 is not updated (no new certificate data is acquired), and the expiration date of the certificate data 115 is not resolved. As a result, the communication sequence is not completed, and the P&C cannot be started. Thereafter, the charge start button 305 may be operated again, but there is a possibility that the information (a part of the vehicle information and the facility information described above) exchanged between the start and the end of the previous communication sequence may be exchanged again in the current communication sequence. This is not preferable from the viewpoint of the efficiency of information transmission in the communication sequence.

The control device 150 according to the embodiment has a configuration for addressing such a problem. Specifically, when the expiration date of the certificate data 115 is found at the start of the communication sequence, the control device 150 executes a process of suspending (sleeping) the communication sequence when the timeout of the update process is predicted. This process includes transmitting a pause request to suspend the communication sequence to the power facility 300.

With such a configuration, the power facility 300 suspends the communication sequence in response to the suspend request. Thus, the communication sequence is paused before the update process times out. Due to the pause of the communication sequence, the data volume of HLC communication is reduced, the data processing load of the control device 150 (HLC-ECU 170) is reduced, and the processing speed of the updating process is improved. As a result, the update process is completed while the communication sequence is suspended (before the timeout of the update process), thereby updating the expiration date of the certificate data 115 and eliminating the expiration date. Therefore, a situation in which the communication sequence ends halfway due to expiration of the expiration date is avoided. Therefore, it is possible to improve the efficiency of information transfer in the communication sequence.

Whether or not the execution time of the update process exceeds the reference time (whether or not a timeout is caused) is predicted (determined) by the control device 150 according to whether or not the update process has been completed within a predetermined time shorter than the reference time from the start of the update process. The predetermined time period is, for example, 3 seconds. In this example, when the update process is not completed within the predetermined time from the start of the update process, a timeout is predicted. When the update process is completed within a predetermined time from the start of the update process, it is determined that the timeout is not caused (the update process is completed within the reference time).

When the update process is not completed within a predetermined time from the start of the update process, there is a possibility that the update process is prolonged. In this case, there is a possibility that the execution time of the communication sequence exceeds the reference time due to the update process and the communication sequence times out. According to the prediction processing based on the predetermined time as described above, it is possible to appropriately predict whether or not a timeout is caused.

Whether or not the updating process has been completed is determined according to whether or not the process of HLC-ECU 170 receiving the certificate data acquisition completion notification and the new certificate data from the power facility 300 and storing the certificate data in the storage device 110 has been completed.

When the update process of the certificate data 115 is completed after the pause of the communication sequence, the control device 150 executes a process of releasing the pause of the communication sequence and resuming the communication sequence. This process includes transmitting a resume request to resume the communication sequence to the power facility 300.

With such a configuration, the communication sequence is resumed in a state in which the expiration date has been eliminated. This allows the communication sequence to be completed before the start of the P&C. Consequently, even if it is found that the certificate data 115 has expired at the start of the communication sequence, DC charge can be automatically started without user manipulation such as re-inserting the connector 301 into the inlet 140 or pressing the charge start button 305.

Figure 3:
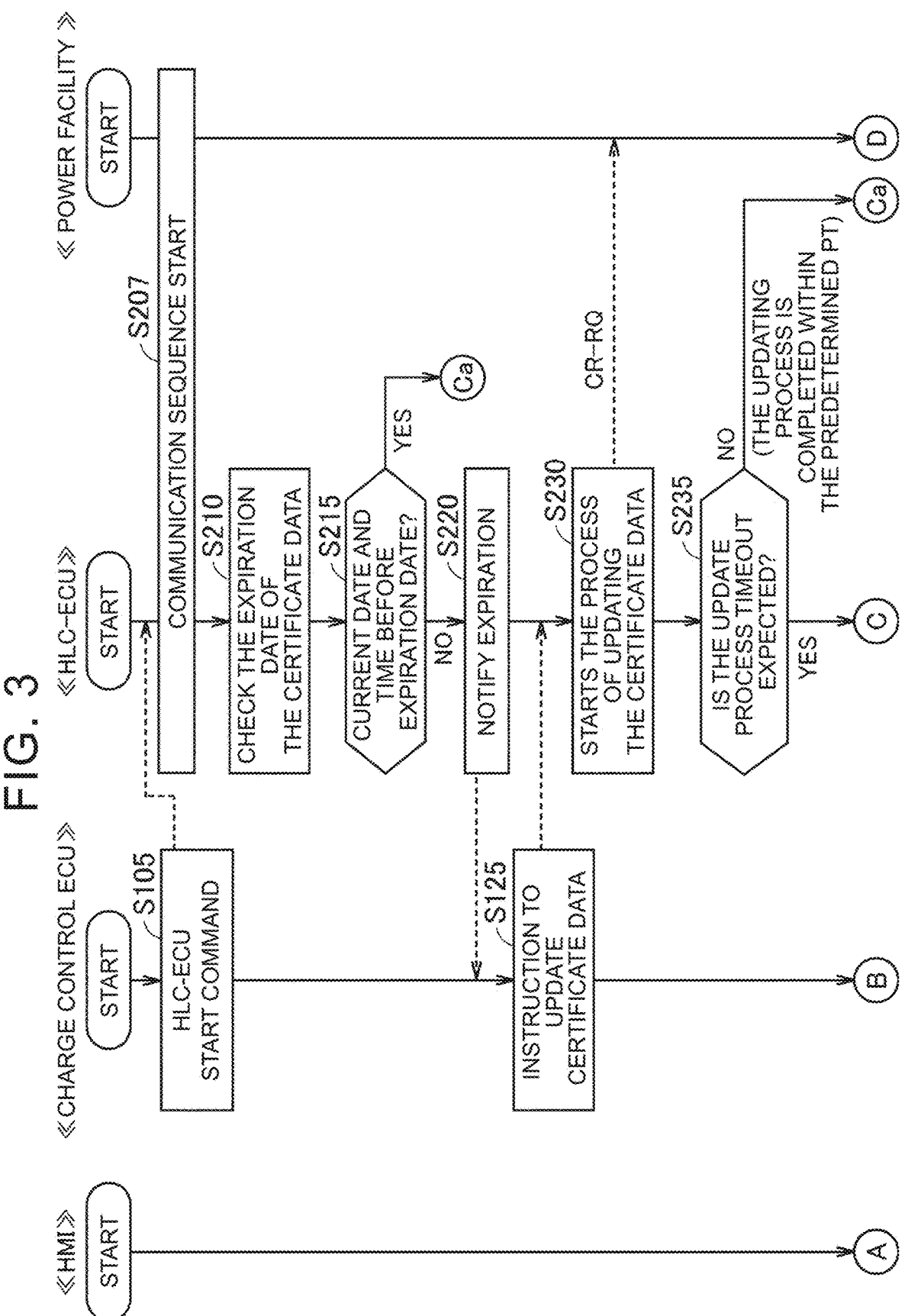
FIG. 3 is a flow chart illustrating a process performed in connection with plug and charge (P&C)
Figure 4:
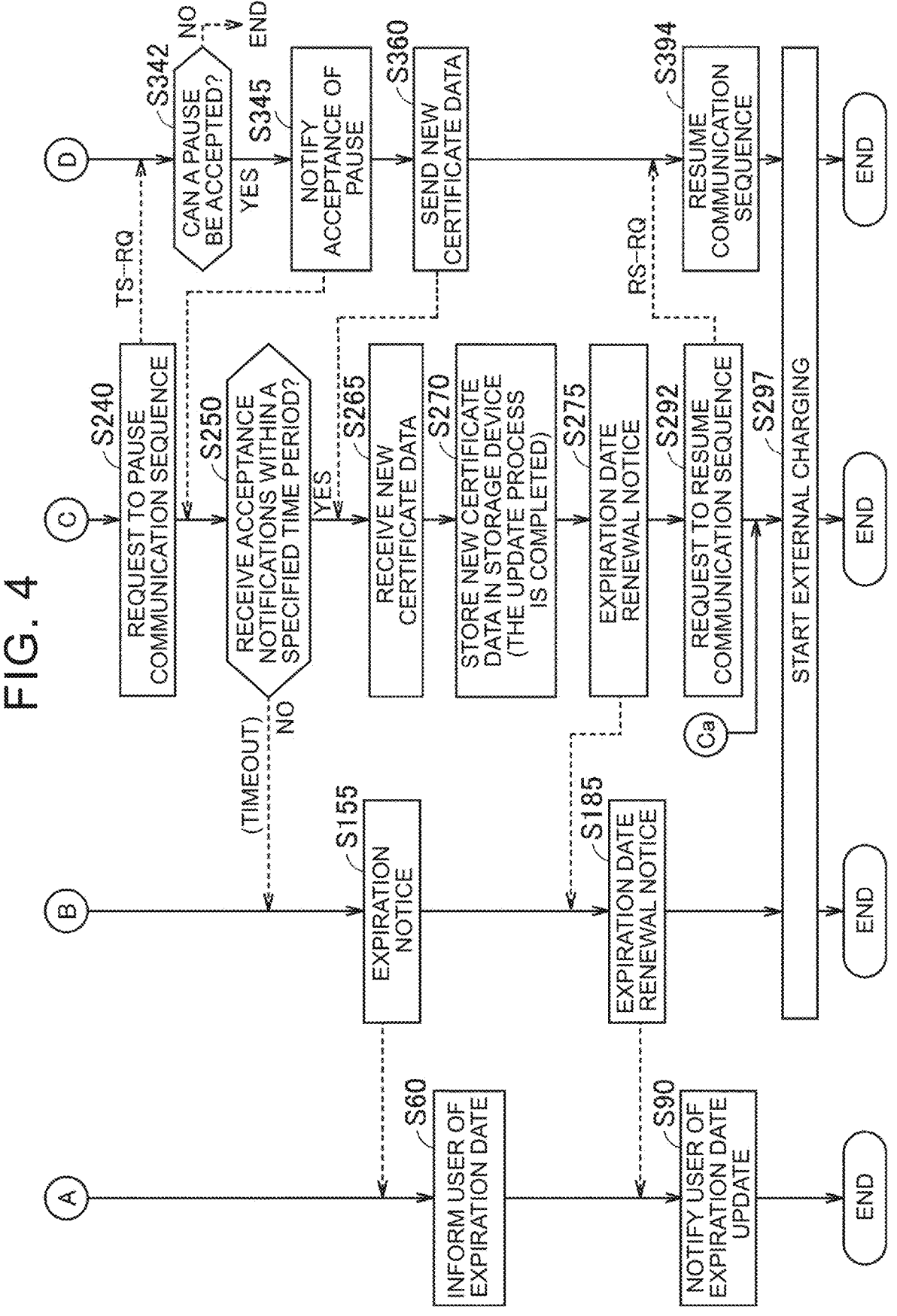
FIG. 4 is a flow chart illustrating a process performed in connection with P&C.

FIG. 3 and FIG. 4 are flow charts illustrating processes performed in connection with P&C. This flowchart starts when the connection of the connector 301 to the inlet 140 is detected.

Referring to FIG. 3, the charge control ECU 160 transmits an activation command to HLC-ECU 170 (S105). HLC-ECU 170 starts responsive to this command and S207 communication with the power facility 300. HLC-ECU 170 checks the expiration date of the certificate data 115 based on the expiration date information 116 at the beginning of the communication sequence (S210).

HLC-ECU 170 determines whether or not the current date and time is prior to the expiration date (S215). If the current date and time is prior to the expiration date, i.e., the expiration date has not expired (YES in S215), HLC-ECU 170 continues the communication sequencing. After the completion of the communication sequence, HLC-ECU 170 process proceeds to S297 of FIG. 4. If the current date and time is later than the expiration date, that is, if the expiration date has expired (NO in S215), HLC-ECU 170 notifies the charge control ECU 160 of the expiration date of the certificate data 115 (S220). The charge control ECU 160 responds to this notification and S125 HLC-ECU 170 to update the certificate data 115. In response to this command, HLC-ECU 170 starts the process of updating the certificate data 115 (S230). Specifically, HLC-ECU 170 transmits a certificate requesting signaling CR-RQ to the power facility 300.

HLC-ECU 170 determines whether or not a timeout of the update process (that is, the execution time of the update process exceeds the reference time) is predicted (S235). Specifically, HLC-ECU 170 determines whether or not the updating process has been completed within a predetermined period of PT. When the timeout is not predicted, that is, when the updating process is completed within the predetermined period of PT (NO in S235), HLC-ECU 170 process proceeds to S297 of FIG. 4. When the timeout is predicted, that is, when the updating process is not completed within the predetermined period of PT (YES in S235), HLC-ECU 170 process proceeds to S240 of FIG. 4.

Referring to FIG. 4, HLC-ECU 170 transmits a pause request TS-RQ requesting pause of the communication sequence to the power facility 300 (S240).

The power facility 300 responds to the pause-request TS-RQ and determines whether the pause of the communication sequence is acceptable (S342). When the power facility 300 is unable to accept the suspension of the communication sequence, for example, if the communication sequence does not conform to the aforementioned communication standard (NO in S342), the process of the power facility 300 ends. The power facility 300 suspends the communication sequence if it is acceptable to suspend the communication sequence (YES in S342). Then, the power facility 300 notifies HLC-ECU 170 of acceptance of the pause of the communication sequence (S345). Specifically, the power facility 300 transmits a pause acceptance notification to HLC-ECU 170. Thereafter, the power facility 300 causes the certificate server 400 to issue new certificate data, and transmits the issued certificate data to HLC-ECU 170 through HLC communication (S360).

HLC-ECU 170 determines whether or not a pause acceptance notification has been received within a predetermined time (for example, within 2 seconds) from S240 (S250). HLC-ECU 170 notifies the charge control ECU 160 of the fact that the notification has not been received (NO in S250) within the predetermined period. In this case, the update process times out. The charge control ECU 160, responsive to the notification from HLC-ECU 170, sends an expiration notification to the vehicle ECU 155 indicating expiration of the certificate data 115, whereby the notification is S155 to the mobile terminal 500 via DCM 120 and the server 200. In response to the expiration notification, the mobile terminal 500 displays a notification window for notifying the user U of the expiration date of the certificate data 115 (S60). This screen may be displayed as a screen for notifying that an error caused by the expiration date has been caused. This may be displayed on HMI device 130 of the vehicle 100.

When HLC-ECU 170 receives the pause acceptance notification within the predetermined period (YES in S250), it receives the newly issued certificate data from the power facility 300 through HLC communication (S265). HLC-ECU 170 stores the certificate data as certificate data 115 in the storage device 110 instead of the old certificate data, thereby completing the updating process (S270).

HLC-ECU 170 transmits an expiration date updating notification to the charge control ECU 160 (S275). This notification indicates that the expiration date of the certificate data 115 has been updated due to the completion of the update process. The charge control ECU 160 sends the notification to the vehicle ECU 155 so that the notification is S185 to the mobile terminal 500 via DCM 120 and the server 200. In response to the expiration date update notification, the mobile terminal 500 displays a notification window for notifying the user U of the expiration date update of the certificate data 115 (S90). This may be displayed on HMI device 130 of the vehicle 100.

After S275, HLC-ECU 170 transmits a resume request RS-RQ requesting resumption of the communication sequence to the power facility 300 (S292). The power facility 300 resumes the communication sequence responsive to the resume request RS-RQ (S394). Thereafter, the communication sequence is completed.

HLC-ECU 170 executes a process for starting P&C (external charge) after the completion of the communication sequence (S297). This process includes a process of transmitting a power supply start command instructing start of power supply to the vehicle 100 to the power facility 300 in accordance with the command from the charge control ECU 160. The power facility 300 starts power supply to the vehicle 100 in response to the power supply start command. This initiates P&C.

As described above, according to the embodiment, the control device 150 suspends the communication sequence when the timeout of the update process of the certificate data 115 is predicted. As a result, a situation in which the communication sequence ends halfway due to expiration of the certificate data 115 is avoided. Therefore, it is possible to improve the efficiency of information transfer in the communication sequence.

If the certificate data 115 has expired, the control device 150 may send a notification to the mobile terminal 500 through DCM 120 and the server 200 prompting for updating the certificate data 115, but the user U may not be aware of this notification. The embodiment is effective when the user U does not notice such notification when inserting the connector 301 into the inlet 140 (immediately before the start of P&C).

Alternative Embodiment

If the update process is prolonged and times out despite the pause of the communication sequence, the communication associated with the update process may be unstable. This communication is, for example, a wireless communication between the power facility 300 and the certificate server 400. When the communication is unstable as described above, it is highly likely that a time-out is caused even when the update process is retried, and therefore it is difficult to update the certificate data 115. In this case, the communication sequence is preferably completely terminated.

HLC-ECU 170 according to this modification executes a process for completely terminating the communication sequence when the updating process times out. This process includes a process of transmitting an end request requesting the end of the communication sequence to the power facility 300.

With such a configuration, when the update process times out (for example, when the communication state is considered to be unstable), the communication sequence is completely terminated. Accordingly, it is possible to avoid a situation in which a situation in which the communication sequence is suspended continues for a long period of time and time is wasted.

Figure 5:
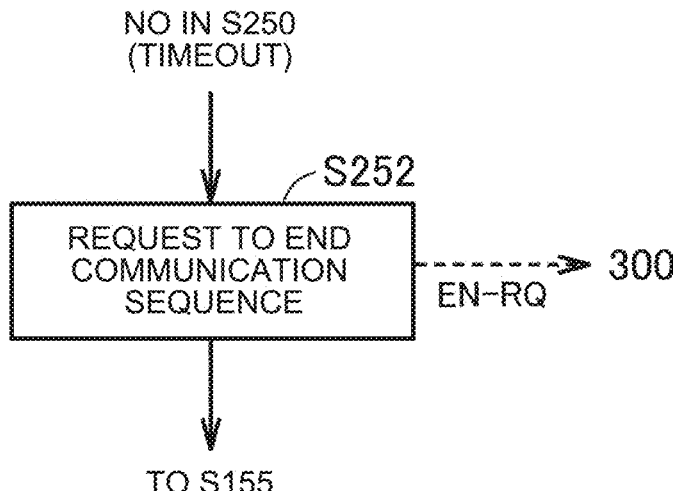
FIG. 5 is a flow chart exemplifying a process executed by high level communication (HLC)-electronic control unit (ECU) in modification.

FIG. 5 is a flow chart illustrating a process executed by HLC-ECU 170 in this modification. Referring to FIG. 5, S250, S155 process is the same as that shown in FIG. 4.

If the updating process times out (NO in S250), HLC-ECU 170 transmits a termination request EN-RQ requesting termination of the communication sequence to the power facility 300 (S252). The power facility 300 completes the communication sequence responsive to the termination request EN-RQ. After S252, the process proceeds to S155. S155 expiration notification may include information for notifying the user U that the certificate data 115 is difficult to be updated due to an unstable communication condition.

As described above, according to this modification, when the update process times out, the communication sequence is completely terminated. Accordingly, it is possible to avoid a situation in which a situation in which the communication sequence is suspended continues for a long period of time and time is wasted.

Other Variations

The vehicle 100 may be other types of electrified vehicle, such as plug-in hybrid electric vehicle (PHEV) that further include engines, as long as they are capable of performing external charging.

Although the power supply power of the power facility 300 is DC power, it may be AC power. External charging using AC power is also referred to as "AC charging". When AC charging of the vehicle 100 is performed, the vehicle 100 includes a charging device (not shown). The charging device converts AC power from the power facility 300 into DC power for charging the battery 105, and supplies the converted power to the battery 105. Thus, the external charge (P&C) is not limited to DC charge, but may be AC charge.

The control device 150 may predict whether or not the timeout of the update process is caused based on the data size of the certificate data 115 (the certificate data before the update). For example, if this data size is greater than or equal to a threshold, a timeout is expected to occur. On the other hand, if this data size is less than the threshold, it is predicted that a timeout will not be caused (the update process will be completed within the reference time). Information indicating the data size is stored in advance in the storage device 110.

DCM 120 may be configured to wirelessly communicate with the certificate server 400. In this situation, the control device 150 may acquire new certificate data from the certificate server 400 through DCM 120 by radio communication instead of HLC communication, and may execute an updating process of the certificate data 115 based on the acquired data.

It should be considered that the embodiments disclosed above are for illustrative purposes only and are not limitative of the disclosure in any aspect. It is intended that the scope of the disclosure be defined by the appended claims rather than the foregoing description, and that all changes within the meaning and range of equivalency of the claims be embraced therein.

What is claimed is:

1. A vehicle capable of executing external charging for charging an in-vehicle power storage device using a power facility provided outside the vehicle, the vehicle comprising:

a storage device that stores certificate data for permitting execution of the external charging; and a control device that controls a communication sequence executed between the power facility and the vehicle before start of the external charging, wherein:

the certificate data have an expiration period; and the control device is configured to:

execute an update process for updating the certificate data when the expiration period has expired at start of the communication sequence; and suspend the communication sequence when a timeout of the update process is predicted, wherein the update process times out when an execution time of the update process exceeds a reference time, the timeout is predicted when the update process is not completed within a predetermined time shorter than the reference time from start of the update process.

2. The vehicle according to claim 1, wherein the control device is configured to resume the communication sequence when the update process is completed after the communication sequence is suspended.

3. The vehicle according to claim 2, wherein the control device is configured to end the communication sequence when the update process times out.

4. The vehicle according to claim 1, further comprising an inlet configured to be connectable to a connector of the power facility and configured to receive power supplied from the power facility, wherein:

the communication sequence is started in response to connection of the connector to the inlet;

the power facility confirms that the vehicle has received predetermined authentication in the communication sequence; and the external charging includes plug-and-charge that is automatically executed after the power facility confirms that the vehicle has received the authentication.

* * * * *